United States Patent Office

3,301,849
Patented Jan. 31, 1967

3,301,849
6-(α-PHENOXYALKANOYLAMINO)
THIOPENICILLANIC ACID
William J. Gottstein and Lee C. Cheney, Fayetteville,
N.Y., assignors to Bristol-Myers Company, New York,
N.Y., a corporation of Delaware
No Drawing. Filed Dec. 9, 1963, Ser. No. 329,243
4 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria. More particularly, this invention relates to α-substituted 6-(aryloxy- and arylmercapto-acetamido)thiopenicillanic acids and salts thereof.

This application is a continuation-in-part of our prior copending United States application Serial No. 306,594 filed September 4, 1963, now abandoned.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous so-called resistant strains of bacteria.

It is an object of the present invention to provide compounds useful in the treatment of infections caused by Gram-positive bacteria, including particularly resistant strains of bacteria, e.g. benzylpenicillin-resistant strains of *Staphylococcus aureus* (*Micrococus pyogenes* var. *aureus*). It is a further object of the present invention, to provide compounds which, in addition to their potent antibacterial activity, exhibit resistance to destruction by acid.

The objects of the present invention have been achieved by the provision of a member selected from the group consiting of acids having the formula (I)
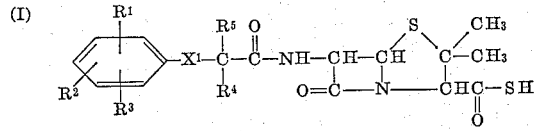

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl, wherein $X^1$ is a member selected from the group consisting of sulfur and oxygen, and wherein $R^4$ is a member selected from the group consisting of (lower)alkyl, phenyl and phenyl(lower)alkyl including benzyl and α- and β-phenethyl and α-, β- and γ-phenylpropyl); and $R^5$ represents hydrogen, (lower)alkyl, phenyl and phenyl(lower)alkyl (including benzyl and α- and β-phenethyl and α-, β- and γ-phenylpropyl); and the pharmaceutically acceptable nontoxic salts thereof.

The pharmaceutically acceptable nontoxic salts of the foregoing acids include nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N(lower)alkylpiperidines (e.g. N-ethylpiperidine) and other amines which have been used to form salts with benzylpenicillin. Also included within the scope of this aspect of the present invention are easily hydrolyzed esters which are converted to the free thioacid form by chemical or enzymatic hydrolysis.

The term "(lower)alkyl" as used herein means both straight and branched chain aliphatic hydrocarbon radicals having from 1 to 10 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)-alkoxy," it refers to the alkyl portion of such group which is therefore as described above in connection with "(lower)alkyl." To illustrate groups including (lower)-alkyl groups, it is pointed out that (lower)alkoxy includes such radicals as methoxy, ethoxy, isopropoxy, etc.; (lower)alkanoyl includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

The α-carbon atom of the acyl group (to which the $R^4$ group is attached) is an asymmetric carbon atom when $R^4$ and $R^5$ are different and, in such cases, the compounds of this invention can therefore exist in two optically active isomeric forms (the D- and L-disastereoisomers), as well as in a mixture of the two optically active forms; all such isomeric forms of the compounds are included within the scope of the present invention.

It should be noted in connection with the foregoing consideration of the disastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration and such 6-aminopenicillanic acid is presently used in the production of the compounds of this invention.

The compounds of the present invention exist in tautomeric forms which can be represented as follows:

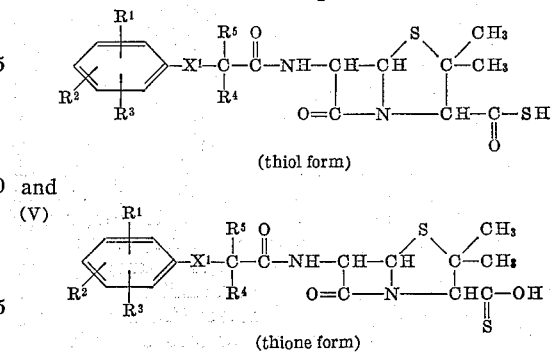

(thiol form)

and (V)

(thione form)

For this reason, the products of the present invention are described by the use of the term "thio," e.g. the compound wherein $R^1$, $R^2$, $R^3$ and $R^5$ are all hydrogen and $R^4$ is methyl and $X^1$ is oxygen is termed "6-(α-phenoxypropionamido)thiopenicillanic acid."

A preferred group of compounds of Formula I are those in which at least one of $R^1$, $R^2$ and $R^3$ is hydrogen; thus the phenyl moiety of such preferred compounds can be represented by the formula (VI)

wherein $R^1$ and $R^2$ each have the meaning set forth above. Of these preferred compounds, a preferred subgroup is that wherein $R^1$ and $R^2$ are selected from the group consisting of hydrogen, (lower)alkoxy, chloro, and radicals of Formulae II and III above wherein $R^6$, $R^7$ and $R^8$ are selected from the group consisting of hydrogen, (lower)alkyl, (lower)alkoxy and chloro. Another preferred group of compounds are those of Formula I wherein $R^1$, $R^2$, $R^3$ and $R^4$ are each hydrogen and $R^5$ is (lower)alkyl.

The compounds of the present invention are prepared from the corresponding penicillins, i.e., the penicillins of the formula (VII)

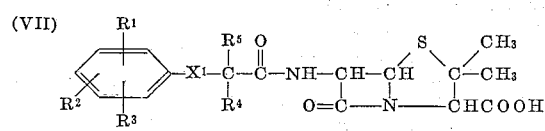

wherein $R^1$, $R^2$, $R^3$, $R^4$ and $R^5$ and $X^1$ are as represented above. Such penicillins can be prepared and isolated by a variety of methods presently known in the art and described in many United States and foreign patents, e.g. U.S. Patents No. 2,941,995, No. 2,996,501, No. 3,035,047 and British Patents No. 877,120, No. 870,395, No. 891,279 and No. 889,199, and in other scientific literature, e.g. the article entitled "Derivatives of 6-Amino-penicillanic Acid. I. Partially Synthetic Penicillins Prepared from α-Aryloxylalkanoic Acids" by Perron et al., vol. 82, J.A.C.S., pp. 3934–3938 (1960).

To prepare the compounds of the present invention an active acylating derivative of the starting penicillin such as an anhydride or an acid chloride is prepared and reacted with a source of sulfhydryl groups, e.g. hydrogen sulfide or sodium hydrosulfide or potassium hydrosulfide. In a preferred process for the preparation of the compounds of the present invention a mixed anhydride (for instance, the mixed anhydride with ethoxy- or isobutoxy-carbonic acid), of a penicillin as described above is prepared according to the procedures illustrated in the examples below and in U.S. Patent No. 2,751,378. Such mixed anhydride is then reacted with an alkali salt of hydrogen sulfide, e.g. sodium hydrogen sulfide (NaHS), to produce the compounds of the present invention which may then be isolated and purified according to the procedures which are known and described in the prior art.

Functional equivalents of the foregoing mixed anhydride of penicillins may also be used. One such functional equivalent is the azolide corresponding to the penicillins of Formula VII above, i.e. an amide of the corresponding penicillin whose nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid (penicillin in the acid form) in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential.

Thus, an elegant procedure for preparing a compound of the present invention by way of a mixed anhydride with ethoxy- or isobutoxy-carbonic acid comprises mixing substantially stoichiometric equivalents of an acid (of Formula VII above), isobutyl chloroformate (or ethyl-chloroformate) and if desired, an acid binding agent such as a tertiary hydrocarbonyl- or aliphatic amine (slight excess), e.g. 2,6-lutidine or triethylamine, in an anhydrous, inert and preferably water-miscible solvent such as dimethylformamide and if desired 2 ml. pure, dry acetone for a short period of time, e.g. about 5 to 60 minutes, in the cold, e.g. at about 5° C. To this solution of the mixed anhydride there is then added a chilled suspension of sodium hydrogen sulfide in an inert anhydrous solvent (e.g., dimethylformamide). The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product is then converted to the free acid, preferably in the cold under a layer of ether by the addition of dilute mineral acid, e.g. 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

Since some of the antibiotic substances obtained by the process of this invention are relatively unstable compounds which readily undergo chemical changes resulting in the loss of antibiotic activity, it is desirable to choose reaction conditions which are sufficiently moderate to avoid their decomposition. The reaction condition chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the compounds of the present invention should in general not exceed 30° C. and in many cases a suitable temperature is ambient temperature. In addition to the use of dimethylformamide for the reaction, use can be made of other organic solvents which do not contain reactive hydrogen atoms. Examples of such inert solvents are dimethylacetamide, methylene dichloride, chloroform, acetone, methyl isobutyl ketone and dioxane. Vigorous stirring is of course advisable when more than one phase is present, e.g. solid and liquid or two liquid phases.

At the conclusion of the reaction, the products are isolated if desired by the techniques used with phenoxyethylpenicillin, benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with phenoxyethylpenicillin, benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g. procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g. pH 2) into diethyl ether, drying the ether and adding at least one equivalent of a solution of potassium 2-ethylhexanoate (e.g. 0.373 gm./ml.) in dry n-butanol. The potassium salt forms, precipitates, usually in crystalline form, and is collected by filtration or decantation.

An alternative method for the preparation of the compounds of the present invention comprises acylating 6-aminothiopenicillanic acid according to procedures which are known in the prior art, e.g. the acid chloride and mixed anhydride procedures which are described in many United States and foreign patents such as are listed above.

6-aminothiopenicillanic acid can be prepared from 6-aminopenicillanic acid by first protecting the amino group of 6-aminopenicillanic acid with a protecting group such as described in United States Patent No. 2,985,648, then forming a mixed anhydride of such protected 6-aminopenicillanic acid by reacting the protected 6-aminopenicillanic acid with an ester of chlorocarbonic acid, e.g. ethyl chlorocarbonate, and then reacting such mixed anhydride with sodium hydrogen sulfide and thereafter removing the protecting group by catalytic hydrogenation. Alternatively, the 6-aminothiopenicillanic acid may be prepared from benzylthiopenicillin as described in United States Patent No. 2,751,378 by enzymatic hydrolysis of such benzylthiopenicillin.

The compounds of the present invention are useful in the treatment of infections caused by Gram-positive bacteria, including particularly the resistant strains of bacteria, e.g. penicillin-resistant strains of *Staphylococcus aureus* (*Micrococcus pyogenes* var. *aureus*). In addition, the compounds of the present invention, in addition to their potent antibacterial activity, exhibit resistance to destruction by acid.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto.

EXAMPLE 1

*Preparation of potassium 6-(DL-α-phenoxypropionamido)thiopenicillanate*

Dilute sulfuric acid is added to a solution of potassium 6-(DL-α-phenoxypropionamido)penicillanate (10 gm., 0.025 mole), dissolved in water (100 ml.) until a pH of 2 is attained. The penicillin acid is extracted from this solution into ether, washed with water, and dried over anhydrous magnesium sulfate. The ether is evaporated under reduced pressure to leave a residual oil which is azeotroped three times with ethyl acetate to remove all traces of water. The residue is dissolved in dimethylformamide (125 ml.) and cooled to 5° C. in an ice bath. 2,6-lutidine (2.7 gm., 0.0254 mole) is added, followed by the dropwise addition of ethyl chloroformate (2.7 gm., 0.0254 mole). The mixture is stirred for 15 minutes and a suspension of sodium hydrosulfide (5.6 gm., 0.06 mole) in dimethylformamide (100 ml.) is added all at once. The solution is stirred for one hour, and turns dark brown. The solution is poured into water (1 liter) and acidified to pH 2 with dilute sulfuric acid. The 6-(DL-α-phenoxypropionamido)thiopenicillanic acid is extracted into ether, washed with water, and dried over anhydrous magnesium sulfate. Potassium 2-ethylhexanoate (5 gm.) is added and the crystalline precipitate is collected and weighs 4.5 gm. Recrystallization from water and acetone yields 1.1 gm. of the product, potassium 6-(DL-α-phenoxypropionamido)thiopenicillanate, as colorless plates which are found to contain the β-lactam ring as shown by infrared analysis, to have a melting point of greater than 240° C. with decomposition and the following elemental analysis.

Calculated for: $C_{17}H_{19}N_2O_4S_2K \cdot \frac{1}{2}H_2O$: C, 47.8%; H, 4.74%; S, 14.9%. Found: C, 48.2%; H, 4.52%; S, 13.8%.

The product is found to inhibit *Staph. aureus* Smith at a concentration of 0.031 mcg./ml., and *Staph. aureus* BX 1633-2 (a strain resistant to benzylpenicillin) at a concentration of 0.40 mcg./ml. and to exhibit upon intramuscular injection in mice a $CD_{50}$ against *Staph. aureus* Smith of 1.1 mg./kg. and against *Staph. aureus* BX 1633-2 of 68 mg./kg.

EXAMPLE 2

In the procedure of Example 1, the potassium 6-(α-phenoxypropionamido)penicillanate is replaced by 0.025 mole of the potassium salt of the acids 6-[α-(2-chlorophenoxy)propionamido] penicillanic acid,
6-[α-(4-sulfamylphenoxy)-n-butyramido]penicillanic acid,
6-[α-(3,4-dimethoxyphenoxy)-n-pentanoamido] penicillanic acid,
6-[α-(3-methylphenoxy)isovaleramido]penicillanic acid,
6-[α-(4-methylthiophenoxy)propionamido]penicillanic acid,
6-[α-(4-dimethylaminophenoxy)-n-hexanoamido] penicillanic acid,
6-[α-(2-methoxyphenoxy)-n-decanoamido]penicillanic acid,
6-[α-(2,4-dichlorophenoxy)phenylacetamido] penicillanic acid,
6-[α-(2-nitrophenoxy)-β-phenylpropionamido] penicillanic acid,
6-[α-(2-acetamidophenoxy)-γ-phenylbutyramido] penicillanic acid,
6-[α-(2,4-dimethylphenoxy)-n-butyramido] penicillanic acid,
6-[α-(4-isopropylphenoxy)propionamido]penicillanic acid,
6-[α-(3-bromophenoxy)-n-butyramido]penicillanic acid,
6-[α-(2-iodophenoxy)phenylacetamido]penicillanic acid,
6-[α-(2-diethylaminophenoxy)isovaleramido] penicillanic acid,
6-[α-(3,5-dichlorophenoxy)isohexanoamido]penicillanic acid,
6-[α-(4-cyclohexylphenoxy)propionamido]penicillanic acid,
6-[α-phenoxy-isovaleramido]penicillanic acid,
6-[α-phenoxy-n-decanoamido]penicillanic acid,
6-[α-phenoxy-γ-phenylbutyramido]penicillanic acid,
6-[α-(2-benzylphenoxy)-n-butyramido]penicillanic acid,
6-[α-(2-trifluoromethylphenoxy)propionamido] penicillanic acid, and
6-[α-(4-fluorophenoxy)propionamido]penicillanic acid, to produce the potassium salts of 6-[α-(2-chlorophenoxy)propionamido]thiopenicillanic acid,
6-[α-(4-sulfamylphenoxy)-n-butyramido] thiopenicillanic acid,
6-[α-(3,4-dimethoxyphenoxy)-n-pentanoamido] thiopenicillanic acid,
6-[α-(3-methylphenoxy)isovaleramido]thiopenicillanic acid,
6-[α-(4-methylthiophenoxy)propionamido] thiopenicillanic acid,
6-[α-(4-dimethylaminophenoxy)-n-hexanoamido] thiopenicillanic acid,
6-[α-(2-methoxyphenoxy)-n-decanoamido] thiopenicillanic acid,
6-[α-(2,4-dichlorophenoxy)phenylacetamido] thiopenicillanic acid,
6-[α-(2-nitrophenoxy)-β-phenylpropionamido] thiopenicillanic acid, 6-[α-(2-acetamidophenoxy)-γ-phenylbutyramido] thiopenicillanic acid,
6-[α-(2,4-dimethylphenoxy)-n-butyramido] thiopenicillanic acid,
6-[α-(4-isopropylphenoxy)propionamido] thiopenicillanic acid,
6-[α-(3-bromophenoxy)-n-butyramido]thiopenicillanic acid,
6-[α-(2-iodophenoxy)phenylacetamido]thiopenicillanic acid,
6-[α-(2-diethylaminophenoxy)isovaleramido] thiopenicillanic acid,
6-[α-(3,5-dichlorophenoxy)isohexanoamido] thiopenicillanic acid,
6-[α-(4-cyclohexylphenoxy)propionamido] thiopenicillanic acid,
6-[α-phenoxy-isovaleramido]thiopenicillanic acid,
6-[α-phenoxy-n-decanoamido]thiopenicillanic acid,
6-[α-phenoxy-γ-phenylbutyramido]thiopenicillanic acid,
6-[α-(2-benzylphenoxy)-n-butyramido]thiopenicillanic acid,
6-[α-(2-trifluoromethylphenoxy)propionamido] thiopenicillanic acid, and
6-[α-(4-fluorophenoxy)propionamido]thiopenicillanic acid, respectively, each of which is isolated as its solid, water-soluble potassium salt and found to inhibit *Staph. aureus* Smith at concentrations of 0.001 percent by weight.

EXAMPLE 3

*Preparation of potassium 6-(D-α-phenoxypropionamido) thiopenicillanate*

Dilute sulfuric acid is added to a solution of potassium 6-(D-α-phenoxypropionamido)penicillanate (5 gm., 0.0125 mole) in water (150 ml.) until a pH of 2 is attained. The penicillin acid is extracted from this solution into ethyl acetate (200 ml.), washed with water, and dried over anhydrous magnesium sulfate. The ethyl acetate is evaporated at 35° C. The residue is dissolved in dimethylformamide (150 ml.) and cooled to 5° C. in an ice bath. 2,6-lutidine (1.33 gm., 0.0125 mole) is added, followed by the dropwise addition of ethyl chloroformate (1.33 gm., 0.0125 mole). The mixture is stirred for 15 minutes and a suspension of sodium hydrosulfide (2.5 gm., 0.0447 mole) in dimethylformamide (100 ml.) is added all at once. The solution is stirred for 20 minutes and then poured into water (1 liter) and acidified to pH 2 with dilute sulfuric acid. The 6-(D-α-phenoxypropionamido)thiopenicillanic acid that forms is extracted into ether, washed with water, and dried over anhydrous magnesium sulfate. Potassium 2-ethylhexanoate (3 gm.) is added and the crystalline precipitate is collected. Recrystallization from water and n-butanol yields 1.7 gm. of the product, potassium 6-(D-α-phenoxypropionamido)thiopenicillanate, which is found to contain the β-lactam ring as shown by infrared analysis, to have a melting point of greater than 195° C. with decomposition and the following elemental analysis:

Calculated for $C_{17}H_{19}N_2O_4S_2K$: C, 48.78%; H, 4.58%; N, 6.7%; S, 15.4%. Found: C, 49.25%; H, 4.68%; N, 6.84%; S, 14.52%.

The product is found to inhibit *Staph. aureus* Smith at a concentration of 0.125 mcg./ml., and *Staph. aureus* BX 1633–2 (a strain resistant to benzylpenicillin) at a concentration of 6.25 mcg./ml. and to exhibit upon intramuscular injection in mice a $CD_{50}$ against *Staph. aureus* Smith of 1.8 mg./kg.

EXAMPLE 4

*Preparation of potassium 6-(L-α-phenoxypropionamido) thiopenicillanate*

Dilute sulfuric acid is added to a solution of potassium 6-(L-α-phenoxypropionamido)penicillanate (5 gm., 0.0125 mole) in water (150 ml.) until a pH of 2 is attained. The penicillin acid is extracted from this solution into ethyl acetate (200 ml.), washed with water, and dried over anhydrous magnesium sulfate. The ethyl acetate is evaporated at 35° C. The residue is dissolved in dimethylformamide (150 ml.) and cooled to 5° C. in an ice bath. 2,6-lutidine (1.33 gm., 0.0125 mole) is added, followed by the dropwise addition of ethyl chloroformate (1.33 gm., 0.0125 mole). The mixture is stirred for 15 minutes and a suspension of sodium hydrosulfide (2.5 gm., 0.0447 mole) in dimethylformamide (100 ml.) is added all at once. The solution is stirred for 20 minutes and then poured into water (1 liter) and acidified to pH 2 with dilute sulfuric acid. The 6-(L-α-phenoxypropionamido)thiopenicillanic acid is extracted into ether, washed with water, and dried over anhydrous magnesium sulfate. Potassium 2-ethylhexanoate (3 gm.) is added and the crystalline precipitate is collected. Recrystallization from water and n-butanol yields 2.5 gm. of the product, potassium 6-(L-α-phenoxypropionamido)thiopenicillanate which is found to have a melting point of greater than 215° C. with decomposition and the following elemental analysis:

Calculated for $C_{17}H_{19}N_2O_4S_2K$: C, 48.78%; H, 4.58%; N, 6.7%; S, 15.4%. Found: C, 50.22%; H, 4.98%; N, 6.77%; S, 14.18%.

The product is found to inhibit *Staph. aureus* Smith at a concentration of 0.016 mcg./ml., and *Staph. aureus* BX 1633–2 at a concentration of 0.8 mcg./ml. and to exhibit upon intramuscular injection in mice a $CD_{50}$ against *Staph. aureus* Smith of 1.0 mg./kg.

EXAMPLE 5

*Preparation of potassium 6-(α-isopropyl-α-phenoxyacetamido)thiopenicillanate*

Dilute sulfuric acid is added to a solution of potassium 6-(α-isopropyl-α-phenoxyacetamido)thiopenicillanate (5.3 gm., 0.0125 mole) in water (150 ml.) until a pH of 2 is attained. The penicillin acid is extracted from this solution into ethyl acetate (200 ml.) washed with water, and dried over anhydrous magnesium sulfate. The ethyl acetate is evaporated at 35° C. The residue is dissolved in dimethylformamide (150 ml.) and cooled to 5° C. in an ice bath. 2,6-lutidine (1.33 gm., 0.0125 mole) is added, followed by the dropwise addition of ethyl chloroformate (1.33 gm., 0.0125 mole). The mixture is stirred for 15 minutes and a suspension of sodium hydrosulfide (2.5 gm., 0.0447 mole) in dimethylformamide (100 ml.) is added all at once. The solution is stirred for 20 minutes and then poured into water (1 liter) and acidified to pH 2 with dilute sulfuric acid. The 6-(α-isopropyl-α-phenoxyacetamido)-thiopenicillanic acid is extracted into ether, washed with water, and dried over anhydrous magnesium sulfate. Potassium 2-ethylhexanoate (3 gm.) is added and the crystalline precipitate is collected. Recrystallization from ethyl acetate and Skellysolbe yields 2.3 gm. of the product potassium 6-(α-isopropyl-α-phenoxyacetamido) thiopenicillanate, which is found to contain the β-lactam ring as shown by infrared analysis, to have a melting point of greater than 170° C. with decomposition, to inhibit *Staph. aureus* Smith at a concentration of 0.125 mcg./ml., and *Staph. aureus* 52–75 (a strain resistant to benzylpenicillin) at a concentration of 0.8 mcg./ml. and to exhibit upon intramuscular injection in mice a $CD_{50}$ against *Staph. aureus* BX 1633–2 of 24 mcg./kg.

EXAMPLE 6

*Preparation of potassium 6-[L(-)-α-phenoxybutyramido] thiopenicillanate*

Potassium 6-[L(-)-α-phenoxybutyramido]penicillanate (2.08 gm., 0.005 mole) is dissolved in water (30 ml.) and layered with ethyl acetate. After cooling to 5° C., dilute phosphoric acid (40%) is added until a pH of 2 is attained. The penicillin acid is extracted into the ethyl acetate and a further extraction with fresh ethyl acetate is made. The combined extracts are washed with ice-water, dried over anhydrous magnesium sulfate, and evaporated to dryness. The residue is dissolved in dimethylformamide (30 ml.) and cooled to 0° C. in an ice bath. 2,6-lutidine (0.53 gm., 0.005 mole) is added, followed by the dropwise addition of ethyl chloroformate (0.52 gm., 0.005 mole) forming a precipitate. The mixture is stirred for 10 minutes at 0° C. and a solution of sodium hydrosulfide trihydrate (1.1 gm., 0.01 mole) in dimethylformamide (30 ml.) is added in one portion. The resulting green solution is stirred for 25 minutes and poured into a precooled (5°–10° C.) mixture of water (150 ml.), acidified to pH 1.5 with dilute phosphoric acid (40%) and benzene (100 ml.) with vigorous stirring. The 6-[L(-)-α-phenoxybutyramido]thiopenicillanic acid is extracted into benzene and a further extraction with fresh benzene is made. The combined extracts are washed and dried. Potassium 2-ethylhexanoate (0.005 mole) is added as a 50% solution of potassium 2-ethylhexanoate in butanol. Skellysolve B (a petroleum ether fraction having a boiling point range of from about 60° to about 68° C. consisting of essentially n-hexane) is added to the solution with cooling and shaking until the solution becomes cloudy, and an oil separates. The solution is decanted and flashed to dryness. The residue is triturated with ether, and a white solid forms which is removed by filtration, washed with dry ether, and dried in vacuo. The product, potassium 6-[L(-)-α-phenoxybutyramido]thiopenicillanate is found to weigh 2 grams, to have a melting point of 145°–149° C. with decomposition, and the structure is confirmed by infrared analysis.

The product is found to inhibit *Staph. aureus* Smith at a concentration of 0.062–0.125 mcg./ml., and *Staph. aureus* BX–1633–2 at a concentration of 0.80 mcg./ml.

EXAMPLE 7

In the procedure of Example 1, the potassium 6-(α-phenoxypropionamido)pencillanate is replaced by 0.025 mole of the potassium salt of 6-(α-phenoxy-α-benzylpropionamido)penicillanic acid,
6-(α-phenylthio-α-benzylpropionamido)penicillanic acid,
6-(α-phenoxy-α-methylpropionamido)penicillanic acid,
6-(α-phenylthio-α-methylpropionamido)penicillanic acid,
6-[a-(2,4-dichlorophenoxy)-α-ethylpropionamido] penicillanic acid,
6-[α-(2-chlorophenoxy)-α-methylbutyramido]penicillanic acid,
6-[α-(4-nitrophenoxy)-α-methyl-n-butyramido] penicillanic acid,
6-[α-(4-bromophenoxy)-α-phenyl-n-valeramido] penicillanic acid,
6-[α-(4-t-butylphenoxy)-α-benzyl-n-butyramido] penicillanic acid,
6-[α-(4-trifluoromethylphenoxy)-α-phenyl-n-butyramido] penicillanic acid,
6-[α-(3-fluorophenoxy)-α-benzyl-n-valeramido] penicillanic acid,
6-[α-(4-sulfamylphenoxy)-α-methylpropionamido] penicillanic acid,
6-[α-(2-benzylphenoxy)-α-methyl-n-butyramido] penicillanic acid,
6-[α-(3-methoxyphenoxy)-α-methyldecanoamido] penicillanic acid,
6-[α-(2-iodophenoxy)-α-phenylpropionamido] penicillanic acid,
6-[α-(3-diethylaminophenoxy)-α-methyl-n-butyramido] penicillanic acid, and
6-[α-(2,4-diisoamylphenoxy)-α-methyl-n-butyramido] penicillanic acid, to produce the potassium salts of 6-(α-phenoxy-α-benzylpropionamido)thiopenicillanic acid,
6-(α-phenylthio-α-benzylpropionamido)thiopenicillanic acid,
6-(α-phenoxy-α-methylpropionamido)thiopenicillanic acid,
6-(α-phenylthio-α-methylpropionamido)thiopenicillanic acid,
6-[α-(2,4-dichlorophenoxy)-α-ethylpropionamido] thiopenicillanic acid,
6-[α-(2-chlorophenoxy)-α-methylbutyramido] thiopenicillanic acid,
6-[α-(4-nitrophenoxy)-α-methyl-n-butyramido] thiopenicillanic acid,
6-[α-(4-bromophenoxy)-α-phenyl-n-valeramido] thiopenicillanic acid,
6-[α-(4-t-butylphenoxy)-α-benzyl-n-butyramido] thiopenicillanic acid,
6-[α-(4-trifluoromethylphenoxy)-α-phenyl-n-butyramido]thiopenicillanic acid,
6-[α-(3-fluorophenoxy)-α-benzyl-n-valeramido] thiopenicillanic acid,
6-[α-(4-sulfamylphenoxy)-α-methylpropionamido] thiopenicillanic acid,
6-[α-(2-benzylphenoxy)-α-methyl-n-butyramido] thiopenicillanic acid,
6-[α-(3-methoxyphenoxy)-α-methyldecanoamido] thiopenicillanic acid,
6-[α-(2-iodophenoxy)-α-phenylpropionamido] thiopenicillanic acid,
6-[α-(3-diethylaminophenoxy)-α-methyl-n-butyramido] thiopenicillanic acid, and
6-[α-(2,4-diisoamylphenoxy)-α-methyl-n-butyramido] thiopenicillanic acid, respectively, each of which is isolated as its solid, water-soluble potassium salt and found to inhibit *Staph. aureus* Smith at concentrations of 0.001 percent by weight.

EXAMPLE 8

In the procedure of Example 1, the potassium 6-(α-phenoxypropionamido)penicillanic acid is replaced by 0.025 mole of the potassium salt of 6-(α-phenylthiopropionamido)penicillanic acid,
6-(α-paranitrophenylthiopropionamido)penicillanic acid,
6-(α-parachlorophenylthiopropionamido)penicillanic acid,
6-(α-phenylthiobutyramido)penicillanic acid,
6-(α-phenylthiocaproamido)penicillanic acid,
6-(α-phenylthioisovaleramido)penicillanic acid,
6-[α-(4-t-butylphenylthio)propionamido]penicillanic acid,
6-[α-ortho-tolylthiopropionamido]penicillanic acid,
6-(α-ortho-nitrophenylthiopropionamido)penicillanic acid,
6-(α-parachlorophenylthiobutyramido)penicillanic acid,
6-[α-(3,4,5-trichlorophenylthio)propionamido] penicillanic acid,
6-[α-(3-trifluoromethylphenylthio)butyramido] penicillanic acid,
6-(α-parabromophenylthioisovaleramido)penicillanic acid,
6-(α-paraphenylphenylthiopropionamido)penicillanic acid,
6-[α-(4-methoxyphenylthio)caproamido]penicillanic acid,
6-[α-(4-cyclohexylphenylthio)butyramido]penicillanic acid,
6-(α-phenylthio-α-cyclohexylacetamido)penicillanic acid,
6-(α-phenylthio-α-cyclopenthylacetamido)penicillanic acid,
6-[α-(2,4-dichlorophenylthio)caproamido]penicillanic acid,
6-[α-2,4-diisoamylphenylthio)propionamido] penicillanic acid,
6-[α-(4-benzylphenylthio)propionamido]penicillanic acid,
6-[α-(4-sulfamylphenylthio)butyramido]penicillanic acid,
6-[α-(2-allyloxyphenylthio)propionamido]penicillanic acid,
6-[α-(4-allylphenylthio)isovaleramido]penicillanic acid,
6-[α-(4-dimethylaminophenylthio)propionamido] penicillanic acid, 6-[α-(2,5-dichlorophenylthio)butyramido]
penicillanic acid,
6-[α-(2-iodophenylthio)propionamido]penicillanic acid,
6-[α-(2-acetamidophenylthio)propionamido]
penicillanic acid,
6-[α-(4-diethylaminophenylthio)propionamido]
acid, and
6-[α-(3-fluorophenylthio)butyramido]penicillanic acid, to produce the potassium salts of 6-(α-phenylthiopropionamido)thiopenicillanic acid,
6-(α-paranitrophenylthiopropionamido)thiopenicillanic acid,
6-(α-parachlorophenylthiopropionamido)
thiopenicillanic acid,
6-(α-phenylthiobutyramido)thiopenicillanic acid,
6-(α-phenylthiocaproamido)thiopenicillanic acid,
6-(α-phenylthioisovaleramido)thiopenicillanic acid,
6-[α-(4-t-butylphenylthio)propionamido]
thiopenicillanic acid,
6-[α-ortho-tolylthiopropionamido]thiopenicillanic acid,
6-(α-ortho-nitrophenylthiopropionamido)
thiopenicillanic acid,
6-(α-parachlorophenylthiobutyromido)thiopenicillanic
acid,
6-[α-(3,4,5-trichlorophenylthio)propionamido]
thiopenicillanic acid,
6-[α-(3,trifluoromethylphenylthio)butyramido]
thiopenicillanic acid,
6-(α-parabromophenylthioisovaleramido)
thiopenicillanic acid,
6-(α-paraphenylphenylthiopropionamido)
thiopenicillanic acid,
6-[α-(4-methoxyphenylthio)caproamido]
thiopenicillanic acid,
6-[α-(4-cyclohexyphenylthio)butyramido]
thiopenicillanic acid,
6-(α-phenylthio-α-cyclohexylacetamido)
thiopenicillanic acid,
6-(α-phenylthio-α-cyclopenthlacetamido)
thiopenicillanic acid,
6-[α-(2,4-dichlorophenylthio)caproamido]
thiopenicillanic acid,
6-[α-(2,4-diisoamylphenylthio)propionamido]
thiopenicillanic acid,
6-[α(4-benzylphenylthio)propionamido]thiopenicillanic
acid,
6-[α-(4-sulfamylphenylthio)butyramido]
thiopenicillanic acid,
6-[α-(2-allyloxphenylthio)propionamido]
thiopenicillanic acid,
6-[α-(4-allylphenylthio)isovaleramido]
thiopenicillanic acid,
6-[α-(4-dimethylaminophenylthio)propionamido]
thiopenicillanic acid,
6-[α-(2,5-dichlorophenylthio)butyramido]
thiopenicillanic acid,
6-[α-(2-iodophenylthio)propionamido]thiopenicillanic
acid,
6-[α-(2-acetamidophenylthio)propionamido]
thiopenicillanic acid,
6-[α-(4-diethylaminophenylthio)propionamido]
thiopenicillanic acid, and
6-[α-(3-fluorophenylthio)butyramido]
thiopenicillanic acid, respectively, each of which is isolated as its solid, water-soluble potassium salt, and found to inhibit *Staph. aureus* Smith at concentrations of 0.001 percent by weight.

EXAMPLE 9

In the procedure of Example 6, the 2.08 grams of potassium 6-[L(−) - α - phenoxybutyramido]penicillanic acid is replaced by 8.32 grams of the same acid to produce in the first crop 4.0 grams of the desired product, potassium 6 - [L(−) - α - phenoxybutyramido]thiopenicillanic acid in crystalline form, having purity of about 95% (as shown by NMR studies), a specific rotation of $$[\alpha]_D^{26} + 177° (C.=½\% \ H_2O)$$

and a melting point range of from 155° to 160° C. with decomposition.

EXAMPLE 10

*Preparation of potassium 6-[D(+)-α-phenoxy butyramido]thiopenicillanate*

Potassium 6 - [D(+)-α-phenoxybutyramido]penicillanate (3.0 gm.) is dissolved in water (30 ml.) and layered with ethyl acetate. After cooling to 5° C., dilute phosphoric acid (40%) is added until a pH of 2 is attained. The penicillin acid is extracted into the ethyl acetate and a further extraction with fresh ethyl acetate is made. The combined extracts are washed with ice-water, dried over anhydrous magnesium sulfate, and evaporated to dryness. The residue is dissolved in dimethylformamide (30 ml.) and cooled to 0° C. in an ice bath. 2,6-lutidine (0.53 gm., 0.005 mole) is added, followed by the dropwise addition of ethyl chloroformate (0.52 gm., 0.005 mole) forming a precipitate. The mixture is stirred for 10 minutes at 0° C. and a solution of sodium hydrosulfide trihydrate (1.1 gm., 0.01 mole) in dimethylformamide (30 ml.) is added in one portion. The resulting green solution is stirred for 25 minutes and poured into a precooled (5°–10° C.) mixture of water (150 ml.), acidified to pH 1.5 with dilute phosphoric acid (40%) and benzene (100 ml.) with vigorous stirring. The 6-[D(+)-α-phenoxybutyramido]thiopenicillanic acid is extracted into benzene and a further extraction with fresh benzene is made. The combined extracts are washed and dried. Potassium 2-ethylhexanoate (0.005 mole) is added as a 50% solution of potassium 2-ethylhexanoate in butanol. Skellysolve B is added to the solution with cooling and shaking until the solution becomes cloudy, and an oil separates. The solution is decanted and flashed to dryness. The residue is triturated with ether, and a white solid forms which is removed by filtration, washed with dry ether, dried in vacuo and found to weight 2.5 gm. The product, potassium 6-[D(+)-α-phenoxybutyramido] thiopenicillanate, is found to have a melting point of 140°–145° C. with decomposition, and the structure is confirmed by infrared analysis.

The product is found to inhibit *Staph. aureus* Smith at a concentration of 0.062–0.125 mcg./ml., and *Staph. aureus* BX–1633–2 at a concentration of 3.1 mcg./ml.

EXAMPLE 11

*Preparation of potassium 6-[D,L-α-phenoxy-propionamido]thiopenicillanate*

Potassium 6-[D,L - α - phenoxypropionamido]penicillanate (30.0 gm.) is dissolved in a mixture of 100 ml. ice water and 100 ml. trichloroethylene. After cooling the mixture to 5° C., 6 N hydrochloric acid is added with stirring until a pH of 2 is attained. The trichloroethylene phase is separated and maintained at 5° C. The aqueous phase is extracted again with 50 ml. of trichloroethylene and the trichloroethylene extracts are combined, mixed with 40 gm. of anhydrous magnesium sulfate and stirred in an ice bath for 30 minutes. The combined extracts are then filtered and the filter cake is washed with 50 ml. of trichloroethylene. The filtrates are placed together with 250 ml. dimethylformamide in a one-liter 3-necked flask with a drying tube vent and cooled to −3° C. in an ice-acetone bath. To the chilled filtrates is then added 10.2 ml. of 2,6-lutidine and then ethylchloroformate (8.7 ml.) over a five-minute period after which the resulting solution of mixed anhydride is stirred in the ice bath for 30 minutes. An anhydrous solution of 16.8 gm. of sodium hydrosulfide trihydrate in 150 ml. of dimethylformamide is mixed with the mixed anhydride solution over a period of five minutes and the resulting slurry is stirred for one hour at 0° C. The slurry is then slowly decanted into 1500 ml. of ice water having a pH of 1.9. The pH of the mixture is maintained at about 2 by adjustment with 6 N hydrochloric acid. The aqueous solution of 6-[D,L-α-phenoxypropionamido]thiopenicillanic acid is extracted and re-extracted with trichloroethylene. The combined trichloroethylene extracts are dried over anhydrous magnesium sulfate in an ice bath and placed under vacuum for 30 minutes to remove hydrogen sulfide. The magnesium sulfate is then filtered off and washed on the filter with trichloroethylene. To the combined filtrates is added 70 ml. of a 22% solution of potassium ethylhexanoate in methyl isobutyl ketone whereupon the product, potassium 6 - [D,L-α-phenoxypropionamido]thiopenicillanate, crystallizes out of solution. The slurry is stirred for 20 minutes at room temperature and thereafter in an ice bath for 75 minutes while the product crystallizes. The product is collected by filtration washed with trichloroethylene, vacuum dried over P₂O₅ for 18 hours and thereafter found to weight 23.9 gm.

EXAMPLE 12

*Preparation of potassium 6-[D,L-α-phenoxybutyramido]thiopenicillanate*

Potassium 6-[D,L-α-phenoxybutyramido]penicillanate (30.0 gm.) is dissolved in a mixture of 100 ml. ice water and 100 ml. trichloroethylene. After cooling the mixture to 5° C., 6 N hydrochloric acid is added with stirring until a pH of 2 is attained. The trichloroethylene phase is separated and maintained at 5° C. The aqueous phase is extracted again with 50 ml. of trichloroethylene and the trichloroethylene extracts are combined, mixed with 40 gm. of anhydrous magnesium sulfate and stirred in an ice bath for 30 minutes. The combined extracts are then filtered, and the filter cake is washed with 50 ml. trichloroethylene. The filtrates are placed together with 250 ml. dimethylformamide in a one-liter 3-necked flask with a drying tube vent and cooled to —3° C. in an ice-acetone bath. To the chilled filtrate is then added 10.2 ml. 2,6-lutidine and then ethylchloroformate, 8.7 ml. over a five-minute period after which the resulting solution of mixed anhydride is stirred in the ice bath for 30 minutes. An anhydrous solution of 16.8 gm. of sodium hydrosulfide trihydrate in 150 ml. of dimethylformamide is mixed with the mixed anhydride solution over a period of five minutes and the resulting slurry is stirred for one hour at 0° C. The slurry is then slowly decanted into 1500 ml. of ice water having a pH of 1.9. The pH of the mixture is maintained at about two by adjustment with 6 N hydrochloric acid. The aqueous solution of 6-[D,L-α-phenoxybutyramido]thiopenicillanic acid is extracted with trichloroethylene. The combined trichloroethylene extracts are dried over anhydrous magnesium sulfate on an ice bath and placed under vacuum for 30 minutes to remove hydrogen sulfide. The magnesium sulfate is then filtered off and washed on the filter with trichloroethylene. To the combined filtrates is added 70 ml. of a 22% solution of potassium ethylhexanoate in methyl isobutyl ketone whereupon the product, potassium 6-[D,L-α-phenoxybutyramido]thiopenicillanate, crystallizes out of solution. The slurry is stirred for 20 minutes at room temperature and thereafter in an ice bath for 75 minutes while the product crystallizes. The product is collected by filtration washed with trichlorethylene, vacuum-dried over P₂O₅ for 18 hours, and thereafter the structure is confirmed by nuclear magnetic resonance and infrared absorption data.

What is claimed is:
1. A compound selected from the group consisting of acids having the formula

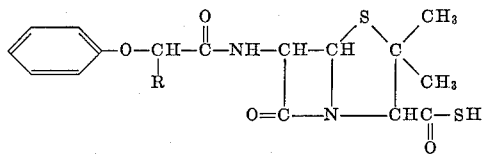

wherein R is (lower)alkyl; and the pharmaceutically acceptable nontoxic salts thereof.

2. 6-(α-phenoxypropionamido)thiopenicillanic acid and the pharmaceutically acceptable nontoxic salts thereof.

3. 6-(α-phenoxybutyramido)thiopenicillanic acid and the pharmaceutically acceptable nontoxic salts thereof.

4. 6-(α-phenoxyisovaleramido)thiopenicillanic acid and the pharmaceutically acceptable non-toxic salts thereof.

References Cited by the Examiner

UNITED STATES PATENTS

| | | | |
|---|---|---|---|
| 2,751,378 | 6/1956 | Johnson et al. | 260—239.1 |
| 2,803,583 | 8/1957 | Peterson et al. | 167—65 |
| 2,854,450 | 9/1958 | Chancy | 260—239.1 |
| 2,966,442 | 12/1960 | Elias et al. | 167—65 |
| 3,079,306 | 2/1963 | Offe et al. | 260—239.1 |
| 3,116,285 | 12/1963 | Celmer et al. | 260—239.1 |
| 3,118,877 | 1/1964 | Perron et al. | 260—239.1 |
| 3,161,634 | 12/1964 | Andersen | 260—239.1 |
| 3,169,127 | 2/1965 | Seto | 260—239.1 |

FOREIGN PATENTS

| | | |
|---|---|---|
| 877,120 | 9/1961 | Great Britain. |
| 891,279 | 3/1962 | Great Britain. |
| 894,247 | 4/1962 | Great Britain. |
| 899,199 | 6/1962 | Great Britain. |

ALEX MAZEL, *Primary Examiner.*

NICHOLAS S. RIZZO, *Examiner.*

J. W. ADAMS, *Assistant Examiner.*